United States Patent [19]
Bakoglu et al.

[11] Patent Number: 5,983,369
[45] Date of Patent: *Nov. 9, 1999

[54] ONLINE SIMULTANEOUS/ALTERING-AUDIO/VIDEO/VOICE DATA BASED SERVICE AND SUPPORT FOR COMPUTER SYSTEMS

[75] Inventors: Brian Bakoglu, Milpitas; Parichay Saxena, Fremont, both of Calif.

[73] Assignees: Sony Corporation, Tokyo, Japan; Sony Electronics Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/668,044

[22] Filed: Jun. 17, 1996

[51] Int. Cl.$^6$ ........................................ G06F 11/00
[52] U.S. Cl. ............................ 714/46; 714/25; 714/31
[58] Field of Search .................. 395/183.01, 183.07, 395/183.22; 186/35; 714/25, 31, 33, 46; 340/825.06

[56] References Cited

U.S. PATENT DOCUMENTS

| | | | |
|---|---|---|---|
| 5,179,695 | 1/1993 | Derr et al. | 395/183.07 |
| 5,367,667 | 11/1994 | Wahlquist et al. | 395/183.03 |
| 5,379,409 | 1/1995 | Ishikawa | 395/183.22 |
| 5,455,933 | 10/1995 | Schieve et al. | 395/183.03 |
| 5,537,653 | 7/1996 | Bianchini, Jr. | 395/183.07 |
| 5,621,789 | 4/1997 | McCalmont et al. | 379/265 |
| 5,650,994 | 7/1997 | Daley | 370/259 |
| 5,689,641 | 11/1997 | Ludwig et al. | 395/200.02 |

OTHER PUBLICATIONS

Integrated Voice Processing and Interactive Voice Response–Active Voice's NT Communications server, Jan. 1995.

*Primary Examiner*—Dieu-Minh T. Le
*Attorney, Agent, or Firm*—Harold T. Fujii; Jerry A. Miller

[57] ABSTRACT

An online computer support system uses simultaneous and alternating transfer of different data types including voice, image, video, and other digital information. This allows a customer service representative and a user having a computer problem to communicate more effectively and solve the problem. The customer service representative can provide prepared tutorials or information to the customer in the form of text, diagrams, and video with synchronized sound. Software at the user computer side automatically interrogates the user computer to determine information about hardware and software components needed to solve problems the user is having. Information, such as the serial number, is programmed into non-volatile memory at the factory for reading during, or at the beginning of, an online support session. The customer service representative can control the user's computer remotely. Software agents are used to perform specific functions. A data base, indexed by information obtained from the user's computer, tracks warranty, support history, and other information. A preventive maintenance function detects components having sporadic problems before they fail as well as flags components as they approach the end of their predicted life spans.

53 Claims, 12 Drawing Sheets

Microfiche Appendix Included
(2 Microfiche, 143 Pages)

ONLINE SIMULTANEOUS/ALTERING-AUDIO/VIDEO/VOICE DATA BASED SERVICE AND SUPPORT FOR COMPUTER SYSTEMS

MICROFICHE APPENDIX

This application includes a Microfiche Appendix containing computer language source code and data (copyright 1996 Sony Corporation). A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates generally to online support services for computer users and specifically to an online support service using integrated audio, image, and other data to provide service and support functions.

BACKGROUND OF THE INVENTION

The popularity of personal computers has made service and support for such computers critical to ensure consumers' efficient use of the computers. Further, because computer designs are so similar, service and support programs also serve to differentiate different manufacturers of the computers. A superior service and support program may well be the difference between mediocre and superior personal computer sales.

However, even though a good service and support-system is important to a computer manufacturer, such a program is difficult and expensive to maintain because of the complexity of today's computer systems and related components, the lack of technical expertise at the user end and the difficulty of solving technical computer problems from a remote location. Part of the difficulty also arises from the "open architecture" of a typical personal computer. Such an open architecture allows many different manufacturers to produce hardware components and software applications for a consumer's personal computer. The combination of specific hardware and software residing on, or operating within, a computer system is referred to as the particular "configuration" of that computer system. Because several different hardware and software manufacturers contribute to any particular configuration, it is difficult for a single manufacturer to provide adequate support for all of the components in the configuration. Also, a given configuration will likely change every few months, or so, as the user purchases new or upgraded hardware and software components.

Despite the difficulty in providing a single source of support for a user's configuration, the user has a very strong expectation of being able to go to the original equipment manufacturer (known as an "OEM," i.e., the manufacturer or assembler of the basic computer components initially shipped together as a "system," typically including the motherboard and housing, hard disk, monitor, operating system software, and bundled applications) for solutions to any problems that the user experiences with the configuration. The user is disappointed if such a service is not provided.

Today's typical support programs allow a user to contact a Customer Service Center staffed and run by the OEM of the user's computer. The contact is usually by telephone. Often the user can use the Internet, modem, or other means to obtain digital information or components such as an updated "patch" to fix a software problem, or instructional text on how to solve a problem.

However, these methods of communication and information access provided by a typical support program do not provide adequate help to the user for various reasons.

One reason that traditional support methods fall short is that in order to diagnose properly a user's computer system problems, a customer service representative in a remote location needs to obtain detailed and accurate information about the user's configuration. Often this is complicated because there is no standard way for hardware or software component manufacturers to identify products, to describe them, or to implement product interfaces.

Also, a personal computer user is generally not a technical person. In this respect, it is difficult for the customer service representative at a remote location to obtain the proper information from the user, or to get the user to perform tasks on the computer system that are necessary in order to fix a problem with the computer. Even if the user is technically trained, it is often difficult to communicate adequately with the user over standard communication devices such as the telephone, fax machine, mail correspondence, etc. Yet other problems exist with typical online service and support practices today. For example, companies will often provide "patches" on the Internet or World Wide Web (WWW or WEB) which the user must download and install in order to fix problems on the computer. This process is often time consuming and is usually handled by having the user end the conversation with the customer service representative, perform the download, install the patch, test out the software, and call the customer service representative back, if necessary. Because Customer Service Centers are notoriously overloaded, obtaining another session with a customer service representative may be frustrating and may require a considerable amount of time.

Thus, it is desirable to provide an online service and support system for improved support, diagnosis, and servicing of remotely located personal computers.

SUMMARY OF THE INVENTION

The present invention connects a remotely located customer service and support center with a user's personal computer.

One embodiment of the invention is an online computer support system including a user computer coupled to a communication line. The online computer support system also includes a Customer Service Center including a customer service representative and electronic equipment coupled to the communication line. The user computer and the electronic equipment each include means for transferring audio information over the communication line; means for transferring image (including video) information over the communication line; and means for transferring digital data over the communication line. The transfer protocol can allow for either simultaneous or alternating transmission of the different data types.

Another embodiment of the invention provides an online computer support system including a user computer coupled to a communication line; hardware components coupled to the user computer; a Customer Service Center including a customer service representative and electronic equipment coupled to the communication line; means, coupled to the user computer and to the electronic equipment, for transferring digital data over the communication line; and means for transferring information about the hardware from the user computer to the Customer Service Center over the communication line.

Yet another embodiment of the invention provides an online computer support system including a user computer coupled to a communication line, software residing in the user computer; a Customer Service Center including a customer service representative and electronic equipment coupled to the communication line; means, coupled to the user computer and to the electronic equipment, for transferring digital data over the communication line; and means for transferring information about the software from the user computer to the Customer Service Center over the communication line.

DETAILED DESCRIPTION OF A PREFERRED EMBODIMENT

Figure 1:
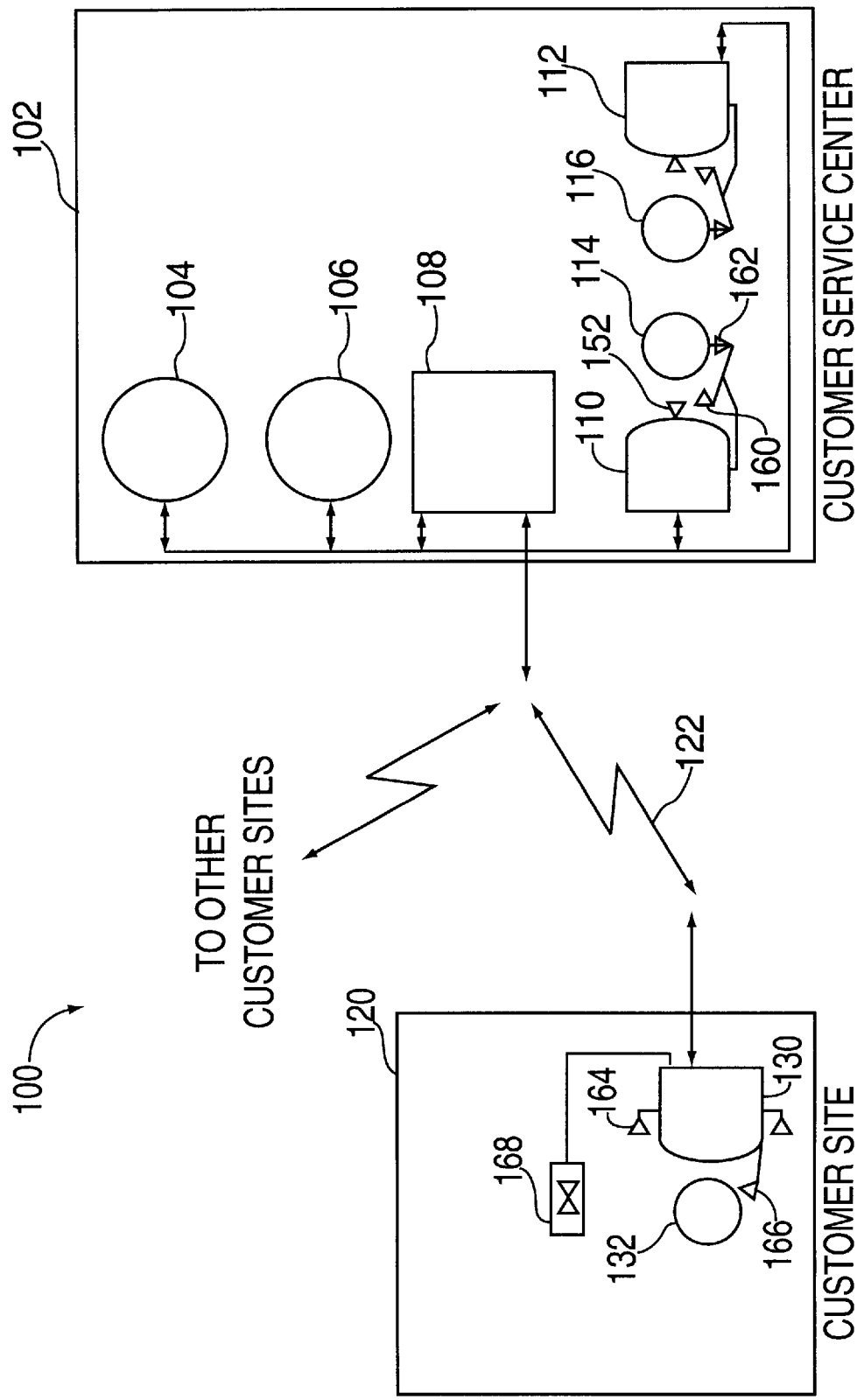
FIG. 1 is a system-level illustration of the online customer service system of the present invention.

FIG. 1 is a system-level illustration of the online customer service system 100 of the present invention. In FIG. 1, Customer Service Center 102 includes electronic equipment such as multimedia server 108, external storage devices 104 and 106, computer stations 110 and 112, and customer service representatives 114 and 116. FIG. 1 shows multimedia server 108 in communication with customer site 120 via a communication link 122. In a preferred embodiment, voice, image, and other digital data are transferred over a so-called "plain old telephone system" (POTS) line. Other communication lines may be used such as an Integrated Services Digital Network (ISDN) line, TI line, coaxial cable, fiber optic cable, satellite transmission, cellular telephone network, or other connection.

Simultaneous transfer of voice and digital data (including images, video, text, etc.) is achieved with a protocol such as Digital Simultaneous Voice/Data (DSVD). Alternating transmission of different data types can be achieved by using, for example, the Asynchronous Voice/Data (AVD) protocol. The preferred embodiment uses both of these protocols. Other protocols may be used.

In FIG. 1, other customer sites (not shown) may be simultaneously supported. Naturally, additional computers, computer peripherals, customer service representatives, and electronic equipment may be included at the Customer Service Center. For example, a video server, teleconferencing capability, etc. may reside at the Customer Service Center and be coupled to the communication link via multimedia server 108. Other ways of communicating with customer site 120 over a communication link may be possible, such as by directly linking a computer, such as computer 110 at Customer Service Center 102, to customer site 120.

At customer site 120 are the user computer 130 and user 132. Various types of information can be captured and digitized at Customer Service Center 102 for transfer to a customer site 120 over the communication line. In FIG. 1, customer service representatives are shown with audio head sets for digitizing voice via a microphone 160 and for playing back sound through earpiece 162. Video camera 152 is used to capture images. The images are then digitized. The overall image and audio data can be synchronized into a presentation, or video program, for playback at the customer site 120. Other types of information may be exchanged with the user as described below.

At customer site 120, the user's computer (PC) 130 is, preferably, a multimedia computer. That is, it is preferable for the user to have speakers such as speaker 164, and a microphone such as microphone 166 connected to user computer 130 to provide for the transmission and playback of audio information. As computers are becoming more popular for educational, entertainment and other home uses, they are increasingly being provided with peripherals such as speakers and microphones as standard equipment to allow playback and capture of audio information. Additionally, it is likely that the use of digitizing cameras will gain in popularity as the cost for such cameras and digitizing hardware decreases. If the user is equipped with a way to capture and transfer image information back to Customer Service Center 102 a future embodiment of the invention will make use of such added capability.

An alternative way for the user to transfer audio information with Customer Service Center 102 is by using a standard telephone handset 168 shown at customer site 120 in FIG. 1. The preferred embodiment uses a personal computer manufactured by Sony Corporation which is provided with a jack that is compatible with the standard telephone line. Thus, the user may plug a standard telephone into the provided jack and establish voice communication with Customer Service Center 102 by using the telephone. The preferred embodiment uses a standard telephone line for simultaneous transfer of image, audio, and other digital data with a standard modem at 28.8 kbps. The data format is the DSVD protocol developed by, among others, Intel Corporation.

Simultaneous transfer of data using DSVD has the advantage that data can be exchanged during a telephone conversation so that, for example, an image frame, which consists of a large amount of data, can be sent over the line while the customer service representative and the user are having a conversation. At other times it may be more advantageous to use the line exclusively for voice or data transfer as in the case where a large amount of image data must be sent before the support session can continue. In this latter case, an AVD implementation may be used. The preferred embodiment uses a protocol implementation called VOICEVIEW, developed by Radish Corporation. This allows the customer service representative and the user to switch back and forth between voice and data transfers as often as necessary.

Figure 2:
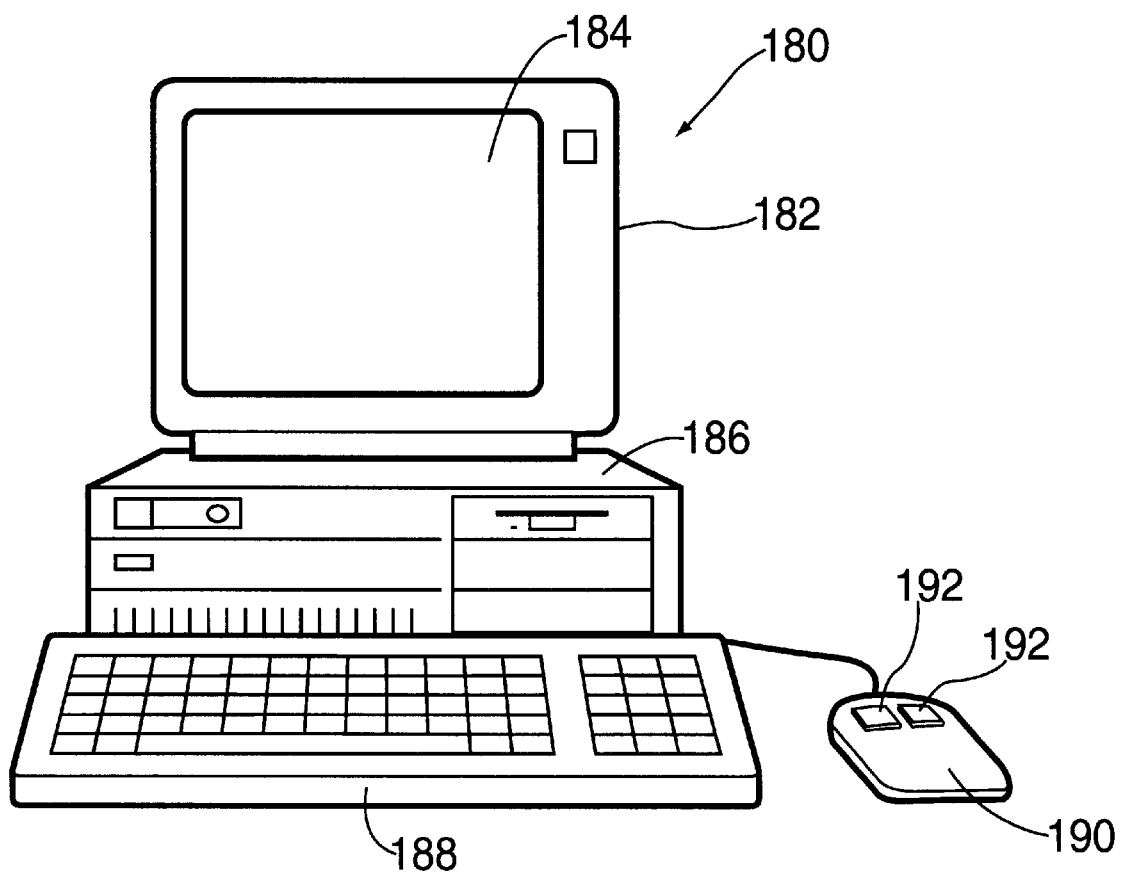
FIG. 2 shows a typical computer system suitable for use with the present invention.

FIG. 2 shows a typical computer system 180. Such a computer system is representative of the type that may be encountered at a customer site, for example, as computer 130 of FIG. 1. Also, such a computer is typical of the type that can be used at Customer Service Center 102 (of FIG. 1) as workstation computers for customer service representatives, such as computers 110 and 112.

In FIG. 2, computer system 180 includes monitor 182 having display screen 184 and housing 186. Housing 186 typically includes standard computer components such as a hard disk drive, random access memory (RAM), processor, and additional hardware components (not shown). Computer system 180 also includes user input devices such as keyboard 188 and mouse 190. Mouse 190 has one or more buttons such as those shown at 192.

Figure 3:
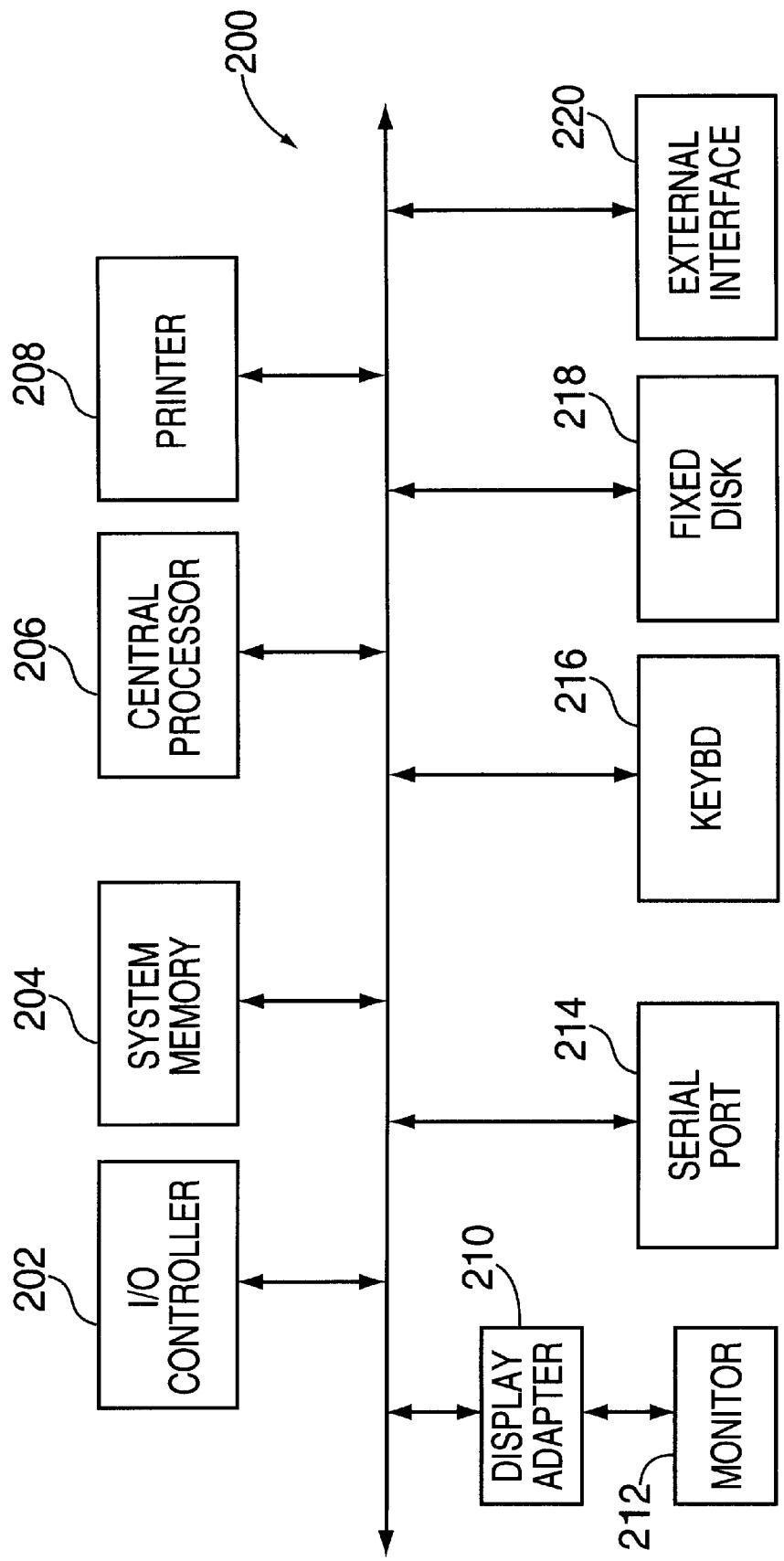
FIG. 3 shows basic subsystems in a typical computer system.

FIG. 3 shows basic subsystems in a typical computer system such as the computer system of FIG. 2.

FIG. 3 shows system bus 200 used to allow transfer of information between subsystems, or components, connected to the bus. For example, central processor 206 executes programs residing in system memory 204 or on fixed disk 218. Also, information can be transferred to devices such as printer 208, serial port 214, I/O controller 202, or external interface 220. Visual information is sent to display adapter 210 for display on monitor 212. Data generated by a human user of the computer is received through input devices such as keyboard 216 or a mouse pointer device (not shown). Other devices may be connected to the system bus through I/O controller 202 or serial port 214. For example, I/O controller 202 can be a Small Computer Systems Interconnect (SCSI) controller or an IEEE 1394 standard bus interface. Many standard devices such as disk drives, video capture cards and consumer electronic devices may be connected to these types of interfaces. Serial port 214 can be used to connect the computer to a telephone line or other communication link, printer, mouse, or other peripheral.

FIG. 3 is merely illustrative of some typical subsystems, or components, found in a computer system. The configuration of any given computer system may vary greatly from that shown in FIG. 3. For example, some computer systems will not have a printer or external interface adapter. Other devices that are common to computers, such as a sound card, are not shown as in FIG. 3. Typically, the speakers and microphone at the user computer as shown in FIG. 1 communicate with the processor and communication line through a sound card mated directly to the bus, or through an interface controller such as a SCSI controller.

In general, subsystems may be added to, or taken away from, those shown in FIG. 3 without departing from the scope of the present invention.

Using Audio, Image and Other Data Over a Single Communication Line to Provide Improved Support The present invention provides computer users and customers (hereinafter collectively referred to as "the user") with both audio and image information, along with other types of information, to improve customer service, product registration, analysis, repair, and hardware and software component update of the user's system. A simple and immediate benefit of providing audio and image data to the user during a customer service session is that the user can see what the customer service representative looks like. This allows the user to relate more easily to the customer service representative and puts the user in a good frame of mind to deal with the technical problems and frustration associated with having the computer malfunction.

Figure 4:
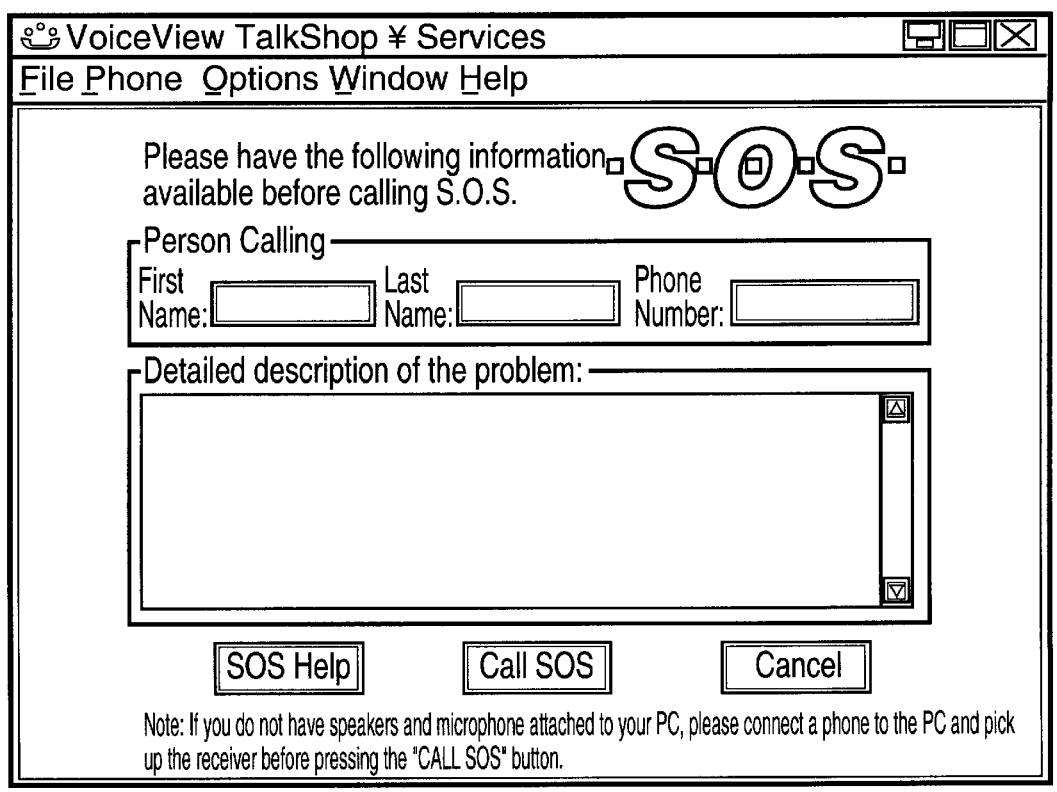
FIG. 4 shows a dialog box of the user interface in the present invention.

FIG. 4 shows a first screen shot of the user interface used in the customer service system of the present invention. This screen appears when the user attempts to connect for a first support session with the Customer Service Center. The user can, alternatively, invoke the session by clicking on an icon that is available from within the application "navigator" provided with each system sent by the manufacturer. In the preferred embodiment, the manufacturer is Sony Corporation, the navigator is referred to as "VAIO Space."

Figure 5:
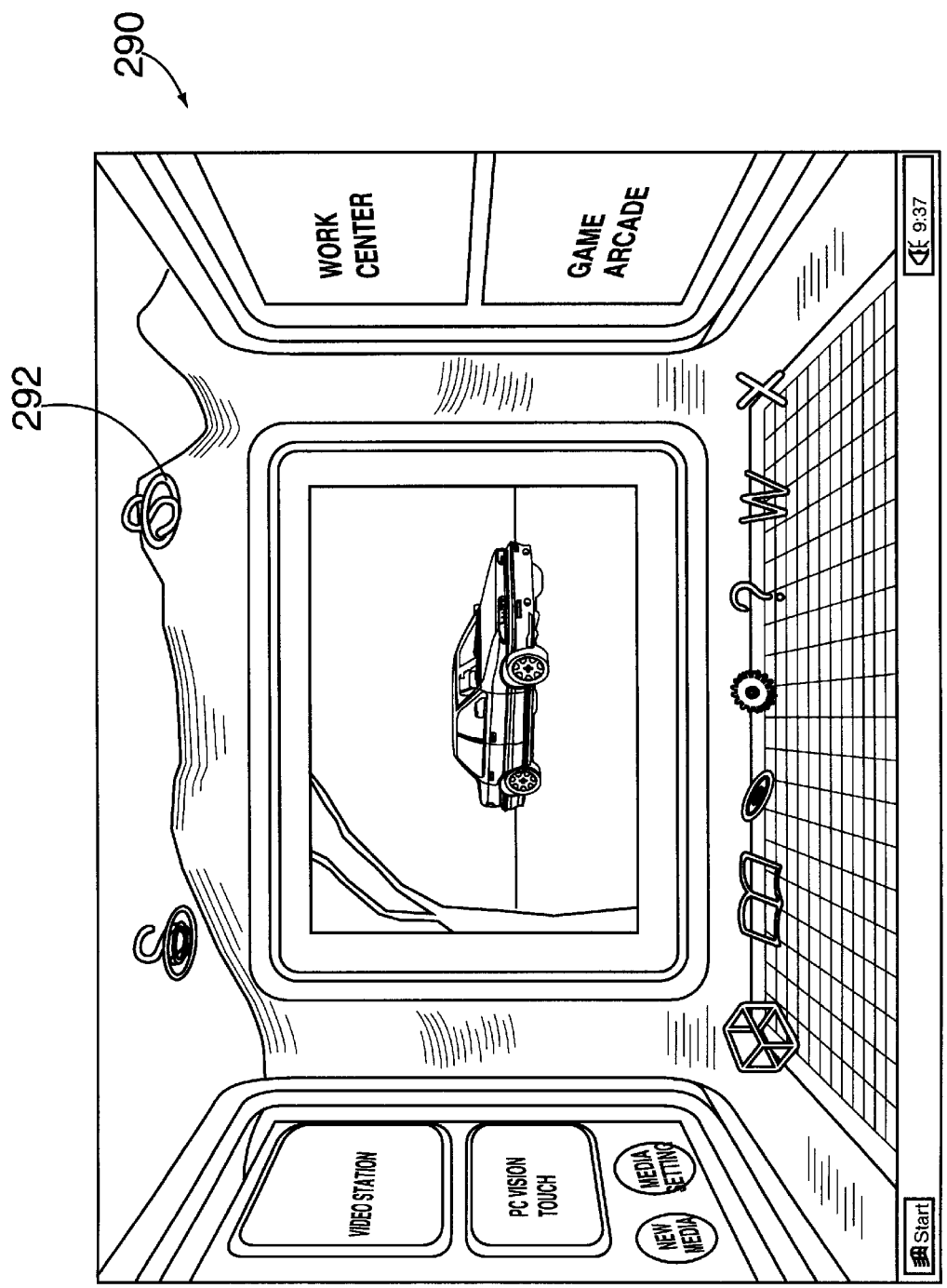
FIG. 5 shows a screen image of the VAIO Space navigator along with an SOS icon for launching the online support system of the present invention.

FIG. 5 shows a screen image 290 of the VAIO Space navigator in the preferred embodiment along with a Sony Online Support (SOS) icon 292 used to launch the SOS system of the present invention. The VAIO Space navigator is discussed in detail in related co-pending patent applications Ser. Nos. 08/962,881 and 08/664,654.

Returning to FIG. 4, in the dialog box the user enters a name, a phone number, and a description of the problem. After the information is filled in, "SOS Help" can be invoked by depressing the button to access a local help data base residing on the user's computer. Alternatively, the "Call SOS" button can be pressed to dial up the remote Customer Service Center for assistance from a customer service representative. There are instructions under the buttons which direct the user to connect a telephone to the PC if the user does not have speakers and a microphone already attached to the PC. After the user presses the "call SOS" button, and after the customer service representative answers the call, the user is presented with new windows shown in FIG. 6.

Figure 6:
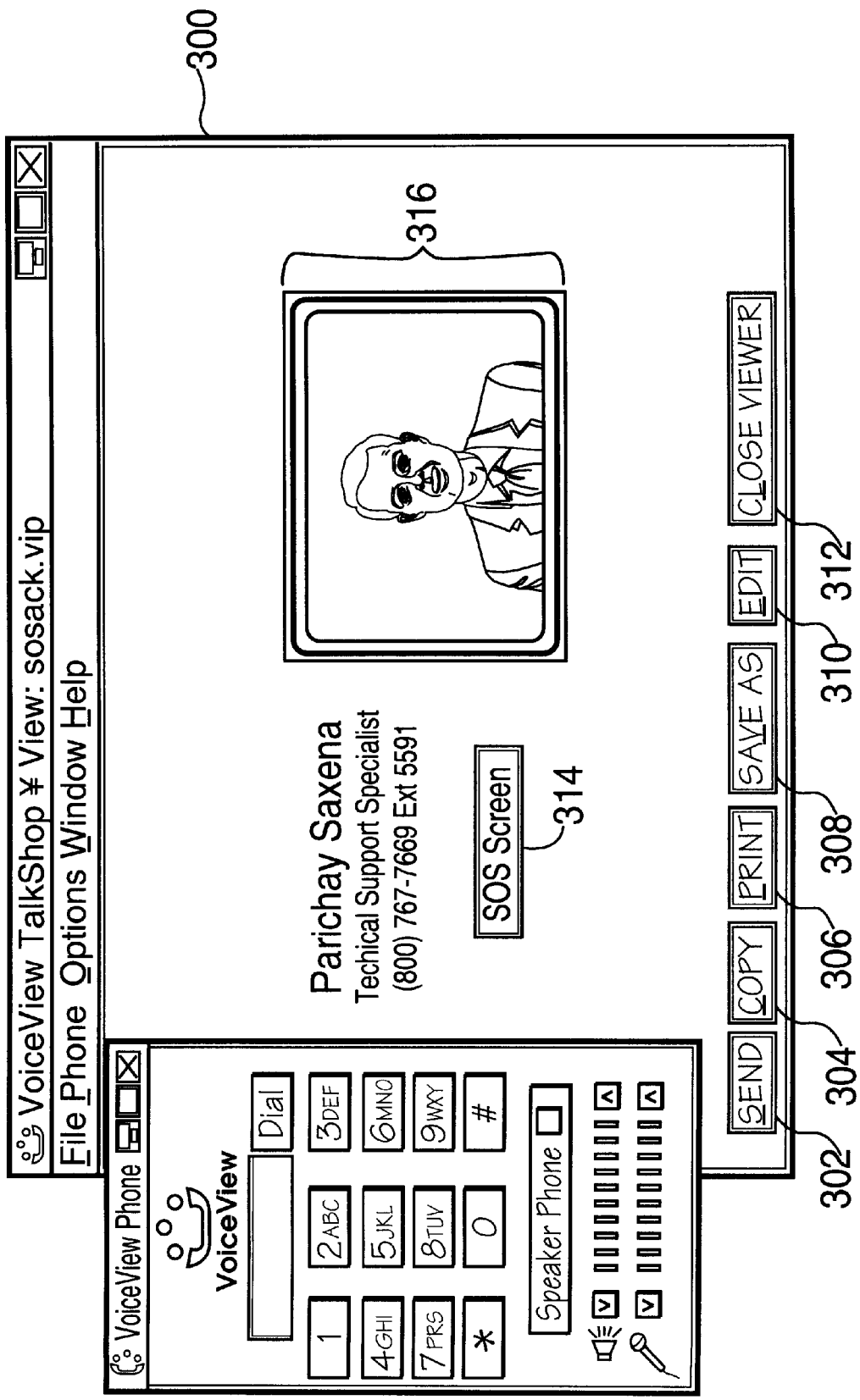
FIG. 6 shows an initial window presented to the user after a connection with the Customer Service Center is made.

FIG. 6 shows an initial window presented to the user after a connection with the Customer Service Center is made. Additionally, a "dial up" window is shown. The dial-up window is used to change the telephone number for the Customer Service Center, if necessary.

In FIG. 6, the name, phone number, extension, and visual image of the customer service representative who will be helping the user in the current support session is shown. The user has options of, e.g., saving, printing, or annotating the information shown in the initial window 300. For example, the user can save the text and image information to disk under a chosen file name by depressing "SAVE AS" button 308. Before saving, the user can edit, or annotate, the information by depressing button 310. "SEND" button 302 is used to forward a screen image such as the screen image shown in FIG. 6, to another PC user assuming that the other PC user has a DSVD modem and SOS software. The user can print the text and image to a printer by depressing the "PRINT" button 306. "COPY" button 304 copies the screen image to the local clipboard of the operating system to allow the image to be transferred to another application. The user may close the initial screen by depressing the "CLOSE VIEWER" button 312. If the view is closed, image data is no longer displayed. However, the user can still be in voice and data contact with the customer service representative.

The user may return to the SOS dialog box shown in FIG. 4 by depressing the "SOS Screen" button 314.

In a preferred embodiment of the invention a single-frame picture of the customer service representative will be shown in the image area at 316. In future embodiments, as communication line bandwidth increases, the image at 316 can be enlarged to fill the entire window, or display screen, as desired, and can be animated to a full-motion video by having the image updated at several frames per second.

Also, synchronized audio will be provided so that the user can see and hear the customer service representative in real time. Not only will this make the support session more human and friendly, but it will also facilitate the exchange of information by, for example, allowing the customer service representative to use hand gestures, hold up different objects or diagrams in front of the video camera, play instructional videos or tutorials, etc. The user may selectively capture screens of the images for future reference or may capture entire segments of the video. Also, the user may annotate the frames of video by depressing the EDIT button and typing in additional informational "notes."

In the future, personal computers will be more apt to have video cameras at the user end. Another option will be camcorders connected to a PC by using IEEE 1394 standard serial data buses. This will allow the customer service representative to view the user, and objects or documents the user might have.

Figure 7:
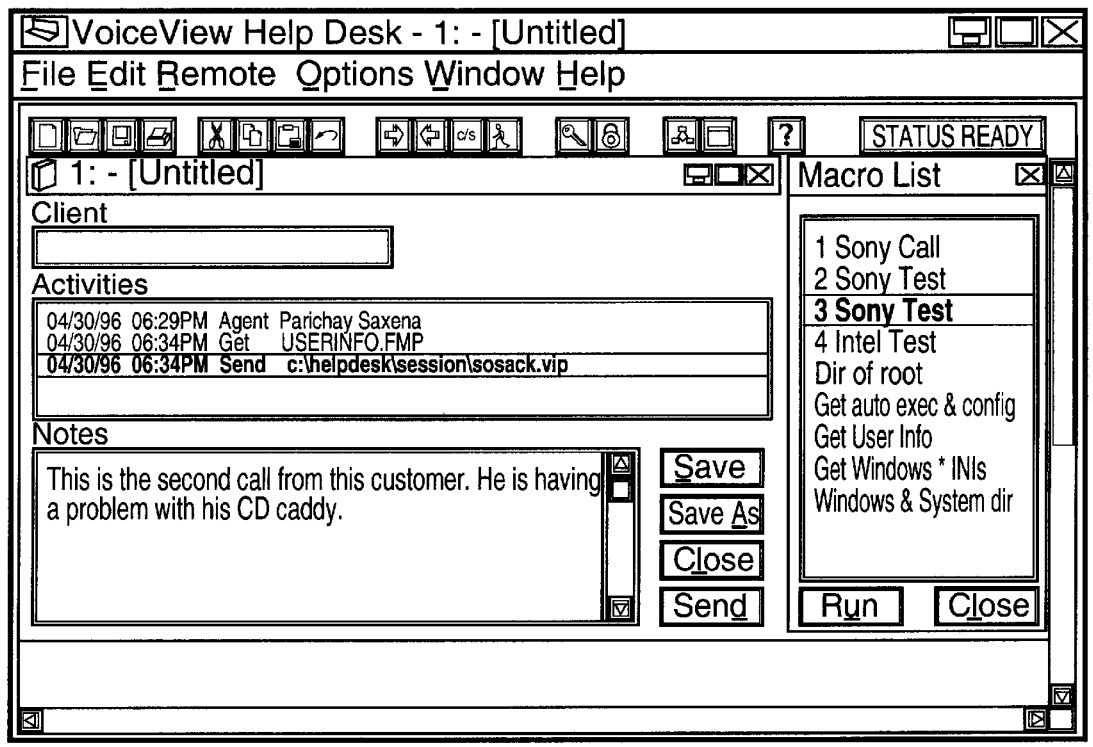
FIG. 7 is a first screen display of a window viewed by the customer service representative during a session with a user.

FIG. 7 is a first screen shot of a window viewed by the customer service representative during a session with a user. In FIG. 7, a box at the center of the window shows a log of session highlights and basic information relevant to the session. For example, the representative's name is entered into the log as the first entry at the top of the box. The second entry shows that user information has been obtained from the user successfuilly. That is, the information which the user has entered into the dialog box of FIG. 4 is obtained. As discussed below, additional information is transferred at the initial connection between the user and the customer service representative. Finally, the fact that an acknowledgment has been sent back to the user computer is logged. As discussed below, identification information obtained from the user's computer is used to index a data base at the Customer Service Center to include detailed information about the history of support activity for a specific user.

In FIG. 7, the box labeled "Notes:" shows information retrieved from the data base. As can be seen, the data base includes information that this is the second call from this user, and that the user is having a problem with his CD caddy. Information such as the information that this is the second call from the user is generated automatically by the data base or other record-keeping features of the Customer Service Center. Additional information, such as the information that the user's problem in a prior session was with the CD caddy, is entered by the customer service representative and maintained in a data base at the Customer Service Center.

The box to the right of the window shown in FIG. 7 contains a "Macro List" which allows the customer service representative to select an activity, text, etc. with a single mouse click more quickly to provide the user with information or to perform a function. The macros in the list can also be selected by using predesignated buttons or hot keys.

Some of the functions that the customer service representative may select include predefined tests that can be sent to the user's computer and executed at the user computer. In a preferred embodiment, the code for these tests already exists at the user computer because it was provided at the time of initial shipment of the user's computer to the user. Other common tasks such as getting a directory listing of the user's root directory, getting copies of the autoexec.bat and config.sys files, getting predesignated user information, or obtaining copies of other critical documents or files in the user system may be instantly obtained by using the Macro List. In the preferred embodiment, transfer of data (e.g., the autoexec.bat and config.sys files) takes place in the background of the session so that the user and customer service representative can communicate both through audio and image data while a file transfer is going on.

Figure 8:
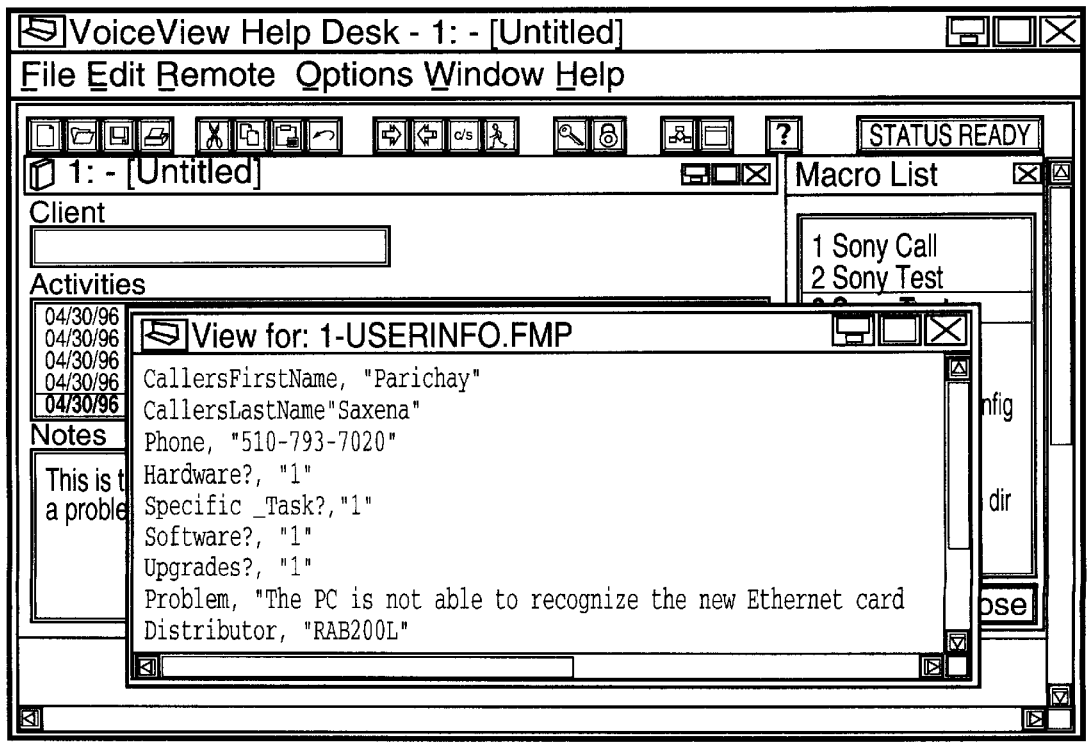
FIG. 8 shows a second screen display viewed by the customer service representative.

FIG. 8 shows a second screen display viewed by the customer service representative.

In FIG. 8, the customer service representative has selected viewing of the file USERINFO.FMP. Part of the information in USERINFO.FMP is provided by the user while software executing at the user's computer automatically obtains another part. For example, in FIG. 8 the user's name and phone number appear along with answers to queries provided by software at the user end that interrogates hardware and software components in the user's system. Part of the interrogation automatically provides the customer service representative with information about the user's hardware and software components and any existing upgrades to these components.

In the preferred embodiment, a standard 28.8 kbps modem is used to transfer data over the telephone line. Of this bandwidth, approximately 9600 bps is used for voice communications and about 14.4 kbps is used for data transfer, including video and image transfer. The remaining bandwidth is used for communication protocol and overhead. Other dynamic and static allocations of data are possible.

One advantage of the present invention is that it allows a customer service representative to present instantly ready-made instructions such as text or video instructions to the user. Thus, when the customer service representative determines that the user's problem is, for example, that the user needs to know how to configure a new peripheral, the customer service representative can send the appropriate text or video tutorial to the user. The selection of the appropriate tutorial can be, for example, a selection on the customer service representative's Macro List. Such tutorials can be stored on a hard disk or CompactDisk—Read Only Memory (CD-ROM) disk or other media. For example, in FIG. 1, a server data base including the tutorial can be connected to the network at the Customer Service Center in a manner similar to that for connecting external storage devices 104 or 106.

Other advantages are provided by the present invention. For example, the customer service representative can "talk" over a ready-made tutorial as the tutorial is presented. Either the customer service representative or the user may stop and start the tutorial, or fast forward and rewind the tutorial similar to a videotape. Also, both parties may "point" to items shown on the screen. That is, both the user and customer service representative's mouse pointers can appear on each computer screen. This facilitates communication. Text that is typed in by one party also appears on the other's screen and can be saved by taking a "snapshot" of the screen at any time or by recording a series of screens, as in a video. Drawing, by using a mouse and pointer in a manner similar to standard drawing programs is possible. This allows, for example, the customer service representative to circle or otherwise highlight and indicate objects on the user's screen.

A customer service representative can also bring in additional support representatives to help in the user's support session. For example, 5 customer service representative 114 of FIG. 1 may transfer the user's session to customer service representative 116. Thus, customer service representative 116 may take over a session in progress. Alternatively, customer service representative 116 can "join" a session already being handled by customer service representative 114. Text and pointer movement for this second customer service representative could appear in a different color on the user computer's screen than the color for the first customer service representative. The voice and image data from customer service representative 116 are provided in a similar manner as discussed above.

Reading Hardware and Software Properties

Another aspect of the present invention is the ability to read properties of the hardware and software components in the user computer system. The present invention uses "interrogation software" comprising the Windows Registry Browser (part of the operating system provided by Microsoft Corp.), the Desktop Management Interface (DMI) browser (provided by Intel Corp. with modifications by Sony Corporation) including $PC_{13}INFO.EXE$, and software developed by Sony Corporation creating executables such as "register.exe" to query and obtain information about hardware and software components in the user computer. Examples of the types of information that the interrogation software can obtain are size of a software data file or program, who created the software module, when the software or hardware component was installed, currently installed Dynamic Link Libraries (DLLs), the version number of the hardware or software component, Interrupt Request (IRQ) levels assigned to a hardware component, device drivers used by a hardware component, status of a component, memory used or allocated, etc. This information forms the heart of most problems that a user can experience.

Figure 9:
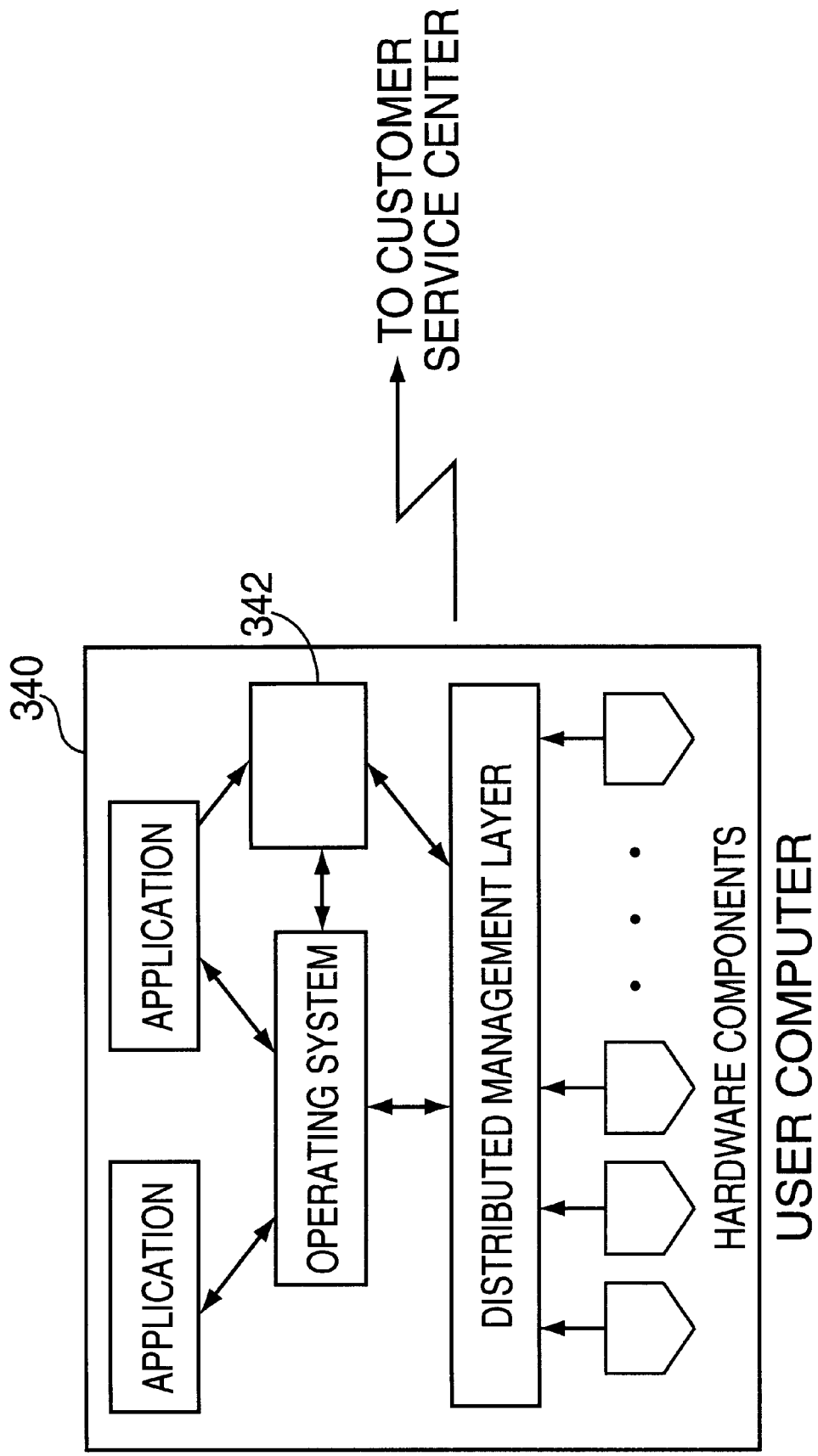
FIG. 9 is a diagram of interrogation software in a user computer.
Figure 10:
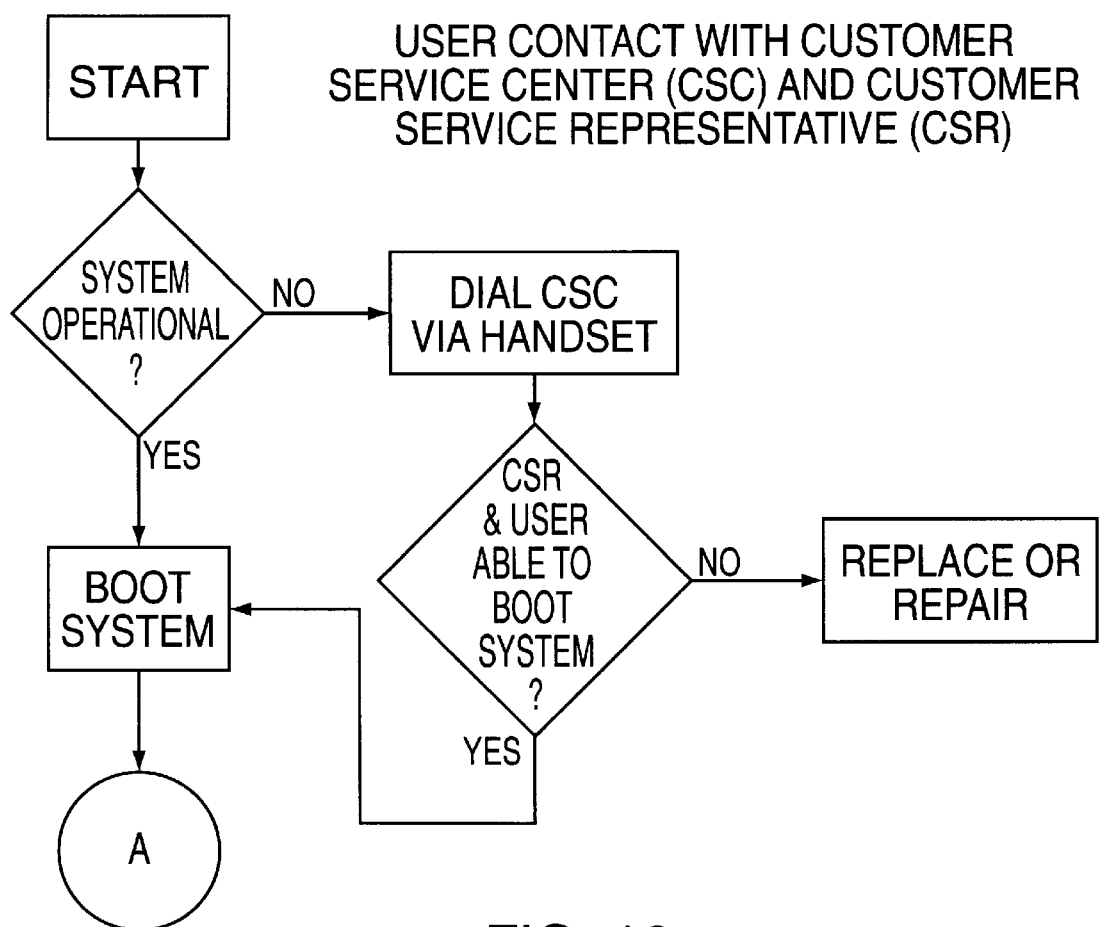
FIG. 10 is a flow chart of the procedure for a user initial contact with the Customer Service Center and the customer service representative.
Figure 11:
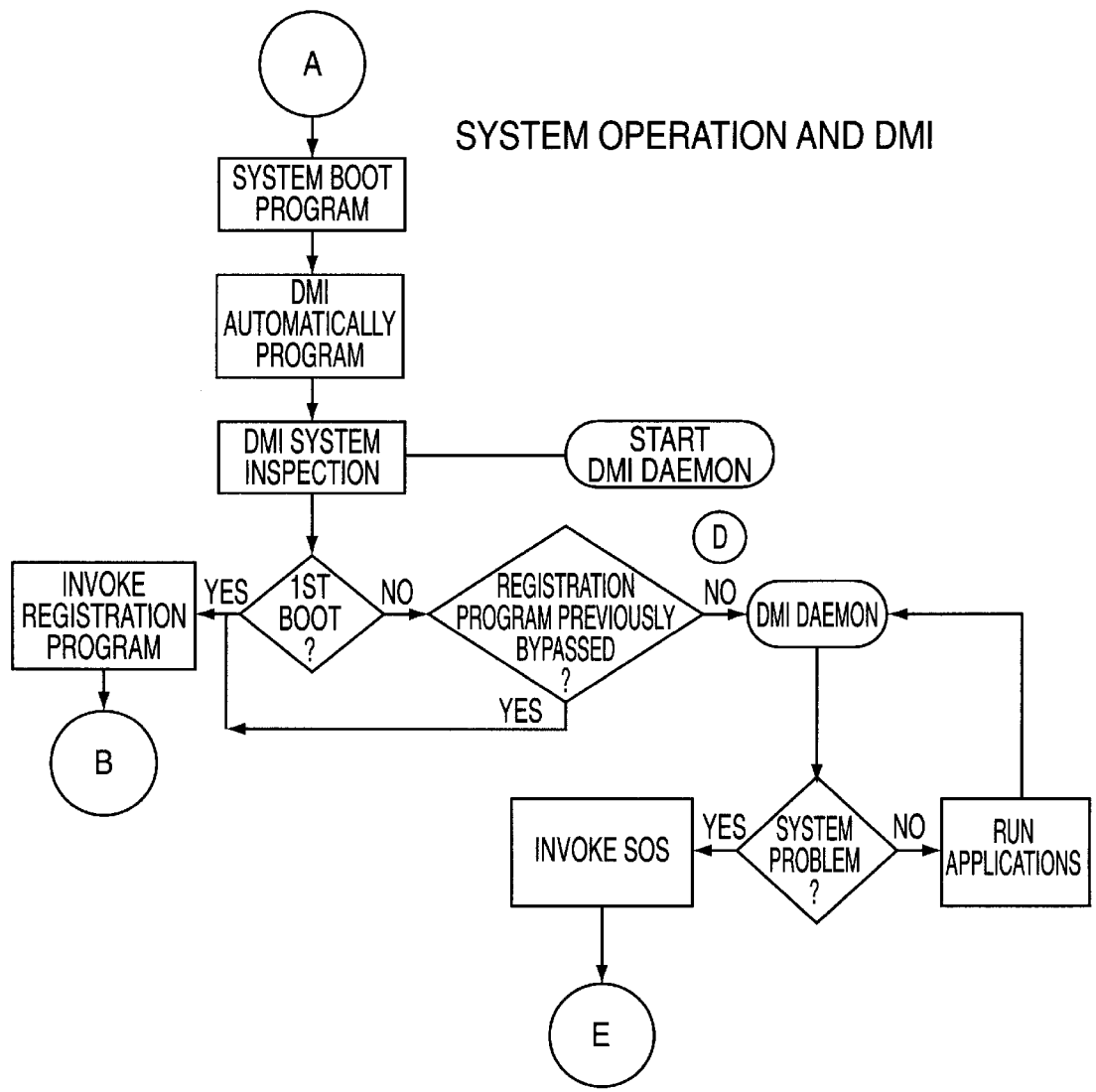
FIG. 11 is a flow chart of the user computer invocation of the registration program and the DMI program.
Figure 12:
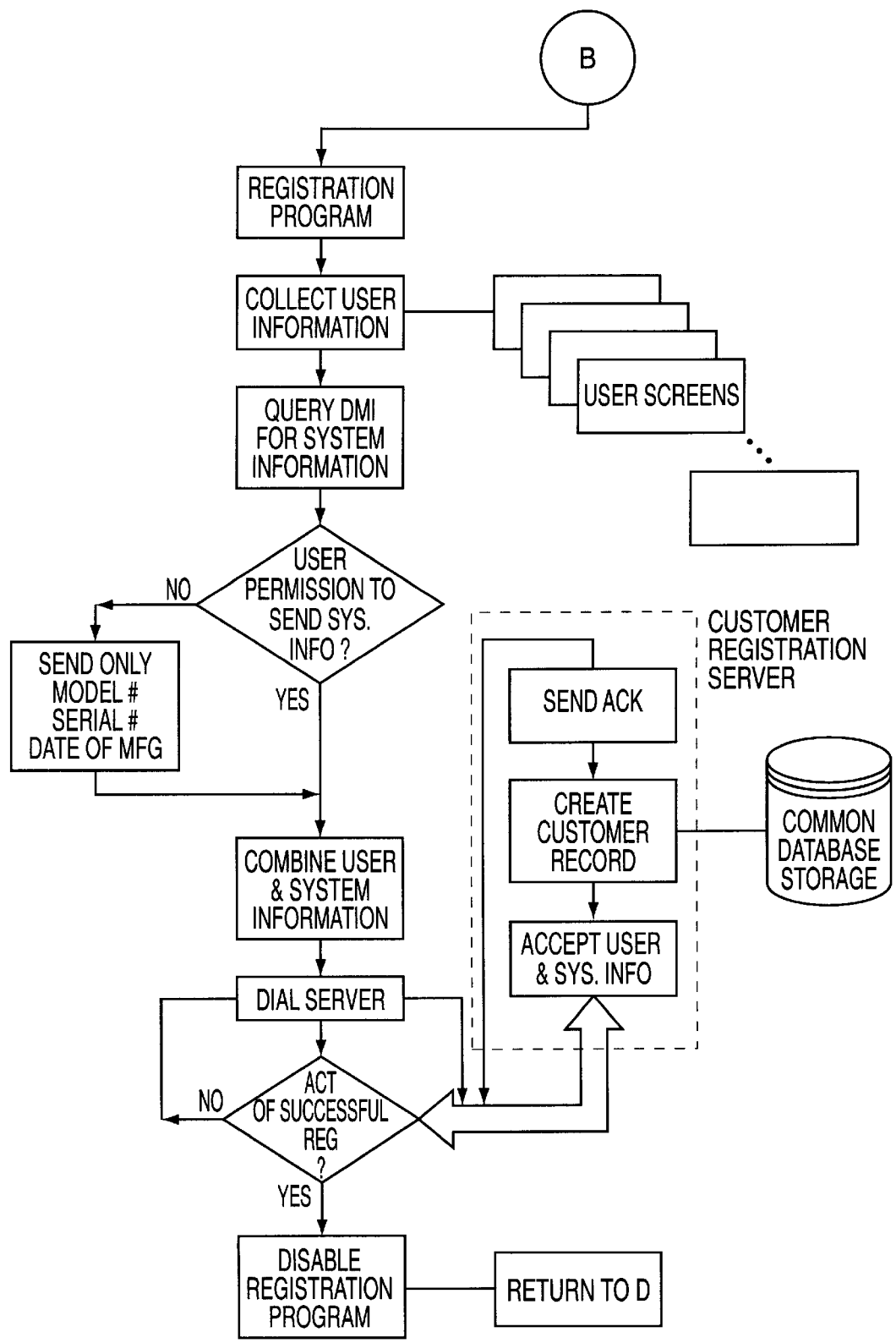
FIG. 12 is a flow chart of the operation of the registration program.
Figure 13:
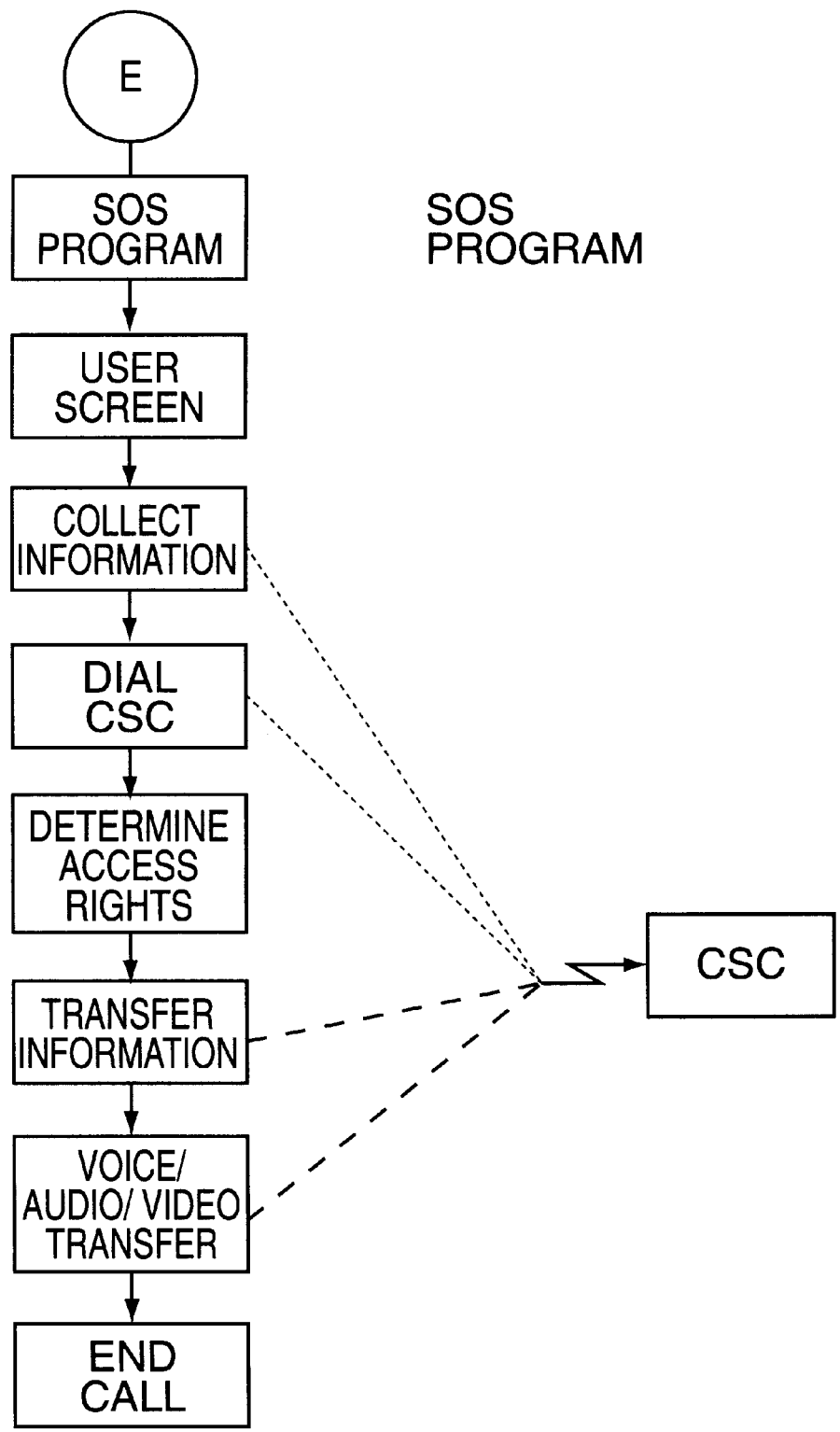
FIG. 13 is a flow chart of the operation of the SOS program.

FIG. 9 shows a diagram of interrogation software 342 residing in user computer 340. Interrogation software 342 communicates with the resident operating system, the DMI and hardware components in the user's computer system. The source code listing of the interrogation software, and related software, is included as Appendix A to this application.

Most of the information that the interrogation software obtains is from the DMI and some operating system data sources, such as the Windows Registry for the Windows 95 operating system. The DMI provides low-level communication with hardware devices to obtain information on properties of the hardware devices, or components. The information obtained is transferred to the Customer Service Center via the communication link as described above.

Table I shows the types of information that are transferred from the interrogation software to the Customer Service Center. In Table I, the interrogation software provides the information listed after the line ";LPT—Printer Ports." All information above this line, under the headings ";ComponentID Group" and ";Base System" is provided in non-volatile memory as programmed at the manufacturing factory of the computer system, discussed below in the next section.

Thus, the provision for interrogation software in the present invention provides the customer service representative with timely, complete, and accurate information about the user's configuration of hardware and software. Such information is critical to the efficient solving of a user's computer problems.

TABLE I

| Pc_info.txt | | |
|---|---|---|
| ;PC Summary | | |
| ; | ------------------ | |
| ;ComponentID Group | | |
| Manufacturer | | |
| Product Name | | |
| Version | | |
| Serial Number | = | SONY10029 |
| Installation | = | 05/30/95 17:56:39.630000–480 |

TABLE I-continued

| Pc_info.txt | | |
|---|---|---|
| Verify | = | component exists, functionality untested |
| ;Base System | | |
| Date/Time | = | Fri Jun 07 15:30:07 1996 |
| Computer Model | = | |
| Serial Number | = | SONY10029 |
| Manufacturer | = | |
| Processor Type | = | Pentium family |
| Processor Speed | = | 42 |
| Numeric Coprocessor | = | Integrated 387-Compatible |
| CacheSize | = | 512 |
| System BIOS Manufacturer | = | Intel Corporation |
| System BIOS Version | = | 0.00.01.DD04 |
| MS DOS Version | = | 7.0 |
| Windows Version | = | 3.95 |
| ;LPT - Printer Ports | | |
| port index | = | 1 |
| Port Name | = | Printer Port (LPT1) |
| Address | = | 378:37B |
| IRQ | = | 7 |
| ;COMM - Serial Ports | | |
| port index | = | 1 |
| Port Name | = | Communications Port (COM1) |
| Address | = | 3F8:3FF |
| IRQ | = | 4 |
| ; | ------------------ | |
| port index | = | 2 |
| Port Name | = | Communications Port (COM2) |
| Address | = | 2F8:2FF |
| IRQ | = | 3 |
| ;SIMM Configuration | | |
| Population (slot:meg.) | = | 1:8 2:8 3:0 4:0 |
| Total Memory (meg.) | = | 16 |
| ;Diskette Drives | | |
| drive index | = | 0 |
| Floppy Drive Name | = | a:\ |
| Size (bytes) | = | -1 |
| Free Space (bytes) | = | -1 |
| ;Hard Drives | | |
| drive index | = | 1 |
| Hard Drive Name | = | c:\ |
| Size (bytes) | = | 1622343680 |
| Free Space (bytes) | = | 1043431424 |
| ;CD-ROM Drives | | |
| drive index | = | 2 |
| CD-ROM Drive Name | = | d:\ |
| Size (bytes) | = | -1 |
| ;Hardware Profile | | |
| device index | = | 1 |
| Device Description | = | Programmable interrupt controller |
| IRQ | = | 2 |
| DMA | = | |
| I/O Range | = | 20:21, A0:A1 |
| Memory Range | = | |
| ; | ------------------ | |
| device index | = | 2 |
| Device Description | = | EISA direct memory access controller |
| IRQ | = | |
| DMA | = | 4 |
| I/O Range | = | 0:F, 80:90, 94:9F, C0:DE, 40B:40B, 410:43F, 481:483, 487:487, 489:48C, 4D6:4D6 |
| Memory Range | = | |
| ; | ------------------ | |
| device index | = | 3 |
| Device Description | = | System timer |
| IRQ | = | 0 |
| DMA | = | |
| I/O Range | = | 40:43 |
| Memory Range | = | |
| ; | ------------------ | |
| device index | = | 4 |
| Device Description | = | System CMOS/real time clock |
| IRQ | = | 8 |
| DMA | = | |
| I/O Range | = | 70:71 |
| Memory Range | = | |

TABLE I-continued

Pc_info.txt

| | | |
|---|---|---|
| ; | ------------------ | |
| device index | = | 5 |
| Device Description | = | System speaker |
| IRQ | = | |
| DMA | = | |
| I/O Range | = | 61:61 |
| Memory Range | = | |
| ; | ------------------ | |
| device index | = | 6 |
| Device Description | = | Numeric data processor |
| IRQ | = | 13 |
| DMA | = | |
| I/O Range | = | F0:FF |
| Memory Range | = | |
| ; | ------------------ | |
| device index | = | 7 |
| Device Description | = | Standard 101/102-Key or Microsoft Natural Keyboard |
| IRQ | = | 1 |
| DMA | = | |
| I/O Range | = | 60:60, 64:64 |
| Memory Range | = | |
| ; | ------------------ | |
| device index | = | 8 |
| Device Description | = | PS/2 Compatible Mouse Port |
| IRQ | = | 12 |
| DMA | = | |
| I/O Range | = | |
| Memory Range | = | |
| ; | ------------------ | |
| device index | = | 9 |
| Device Description | = | System board extension for PnP BIOS |
| IRQ | = | |
| DMA | = | |
| I/O Range | = | |
| Memory Range | = | E8000:FFFFF, 0:9FFFF, 100000:FFFFFF, FFFC0000:FFFFFFFF |
| ; | ------------------ | |
| device index | = | 10 |
| Device Description | = | PCI bus |
| IRQ | = | |
| DMA | = | |
| I/O Range | = | CF8:CFF |
| Memory Range | = | |
| ; | ------------------ | |
| device index | = | 11 |
| Device Description | = | IO read data port for ISA Plug and Play enumerator |
| IRQ | = | |
| DMA | = | |
| I/O Range | = | |
| Memory Range | = | |
| ; | ------------------ | |
| device index | = | 12 |
| Device Description | = | Primary IDE controller (dual fifo) |
| IRQ | = | 14 |
| DMA | = | |
| I/O Range | = | 1F0:1F7, 3F6:3F6,FFA0:FFA7 |
| Memory Range | = | |
| ; | ------------------ | |
| device index | = | 13 |
| Device Description | = | Intel PIIIX Bus Mastering PCI IDE Controller |
| IRQ | = | 14, 15 |
| DMA | = | |
| I/O Range | = | 1F0:1F7, 3F6:3F6, 170:177, 376:376, FFA0:FF A7, FFA8:FFAF |
| Memory Range | = | |
| ; | ------------------ | |
| device index | = | 14 |
| Device Description | = | Secondary IDE controller (dual fifo) |
| IRQ | = | 15 |
| DMA | = | |
| I/O Range | = | 170:177, 376:376, FFA8:FFAF |
| Memory Range | = | |
| ; | ------------------ | |
| device index | = | 15 |
| Device Description | = | PCI Card |
| IRQ | = | 9 |
| DMA | = | |
| I/O Range | = | FF40:FF5F |
| Memory Range | = | |
| ; | ------------------ | |
| device index | = | 16 |
| Device Description | = | ATI mach64 PCI (macxw4) (DirectDraw) |
| IRQ | = | |
| DMA | = | |
| I/O Range | = | 3B0:3BB, 3C0:3DF |
| Memory Range | = | C0000:C7FFF, A0000:AFFFF, B0000:BFFFF, FE000000:FEFFFFFF |
| ; | ------------------ | |
| device index | = | 17 |
| Device Description | = | Modem Game & Data Line |
| IRQ | = | |
| DMA | = | |
| I/O Range | = | |
| Memory Range | = | |
| ; | ------------------ | |
| device index | = | 18 |
| Device Description | = | 28.8 DSVD Modem |
| IRQ | = | 10 |
| DMA | = | |
| I/O Range | = | FC80:FCFF |
| Memory Range | = | |
| ; | ------------------ | |
| device index | = | 19 |
| Device Description | = | Modem Voice & Fax Line |
| IRQ | = | |
| DMA | = | |
| I/O Range | = | |
| Memory Range | = | |
| ; | ------------------ | |
| device index | = | 20 |
| Device Description | = | Standard Floppy Disk Controller |
| IRQ | = | 6 |
| DMA | = | 2 |
| I/O Range | = | 3F0:3F5,3F7:3F7 |
| Memory Range | = | |
| ; | ------------------ | |
| device index | = | 21 |
| Device Description | = | Printer Port (LPT1) |
| IRQ | = | 7 |
| DMA | = | |
| I/O Range | = | 378:37B |
| Memory Range | = | |
| ; | ------------------ | |
| device index | = | 22 |
| Device Description | = | Communications Port (COMI) |
| IRQ | = | 4 |
| DMA | = | |
| I/O Range | = | 3F8:3FF |
| Memory Range | = | |
| ; | ------------------ | |
| device index | = | 23 |
| Device Description | = | Communications Port (COM2) |
| IRQ | = | 3 |
| DMA | = | |
| I/O Range | = | 2F8:2FF |
| Memory Range | = | |
| ; | ------------------ | |
| device index | = | 24 |
| Device Description | = | Motherboard resources |
| IRQ | = | |
| DMA | = | |
| I/O Range | = | 78:79, F86:F87 |
| Memory Range | = | |
| ; | ------------------ | |
| device index | = | 25 |
| Device Description | = | YAMAHA OPL3-SA Sound System |
| IRQ | = | 11, 5 |
| DMA | = | 0, 1 |
| I/O Range | = | 220:22F, 530:537, 330:331, 388:38B |

TABLE I-continued

Pc_info.txt

| | | |
|---|---|---|
| Memory Range | = | |
| ; | ------------------- | |
| device index | = | 26 |
| Device Description | = | YAMAHA OPL3-SA GamePort |
| IRQ | = | |
| DMA | = | |
| I/O Range | = | 201:201 |
| Memory Range | = | |

Factory-Stored Identifiers

Another feature of the present invention is the use of factory-stored identifiers to provide necessary information to tie-in a particular user's computer to data base statistics and other information kept at the Customer Service Center. In the preferred embodiment, the information programmed at the factory includes the information in Table I's first two sections labeled ";ComponentID Group" and ";Base System". For example, the manufacturer ("Sony Corporation" in the preferred embodiment) and serial number are programmed before the computer is shipped to an end-user or to a retailer.

This information is transferred to the Customer Service Center by the interrogation software at the start of a support session. At the Customer Service Center, information such as the serial number is used to index a local data base to retrieve records for the user's particular computer such as a history of support sessions. By embedding the information directly into non-volatile memory on the motherboard of the computer system, e.g., in a read-only memory (ROM) chip, and by transferring the information at the start of each support session, the accuracy of such data and tracking of user problems is ensured.

The information provided by the interrogation software, in conjunction with records kept on the local data base, assists the customer service representative in determining copyright protection issues, validating warranties, inventory control, maintaining service and upgrade history and in manufacturing process flow control.

Online Agents and Other Features

The architecture of the present invention allows the customer service representative to transfer software "agents" to the user computer system. The transfer of an agent is similar to the transfer of other data such as files or tutorials, discussed above. An agent has the ability to be executed at the user computer and perform a function such as obtaining additional information from the user computer system and sending the information back to the customer service representative.

Additionally, agents can be used for many purposes. Some of the functions are reconfiguring software, hardware, or firmware; upgrading software, hardware, or firmware; performing preventive maintenance of software, hardware, or firmware; fixing a failed component; and updating and reprogramming access control information.

Preventive maintenance is a feature of the present invention's online support system. Preventive maintenance allows a routine executing at the user's computer to detect if a component is having sporadic problems and may fail in the near future. Another aspect is to monitor a component, such as a hard disk drive, and log the number of hours against the mean time to failure of the component. The component can be automatically ordered shipped to the user (if hardware) or automatically downloaded to the user's computer before the component actually fails.

The present invention allows "remote control" of a user's computer by the customer service representative. Remote control allows a customer service representative to take control of a user's computer and access applications on the user's computer from the customer service representative's computer. That is, commands can be typed, buttons and icons selected, etc., on the user's computer by having the signals from the customer service representative's input devices sent to the user's computer. The control can be preemptive or shared. In a shared mode both the user and customer service representative can control the user's computer. Voice and other data communication are possible during remote control.

Thus, a system for online computer support has been discussed above. Although the invention has been discussed with respect to a specific embodiment, the scope of the invention is to be determined solely by the appended claims.

In the claims:

1. An online computer support system for diagnosing a fault in a user computer operated by a user and coupled to a communication line, said system comprising:

a customer service center including a customer representative and electronic equipment coupled to the communication line;

wherein the user computer and the electronic equipment each include means for transferring audio information over the communication line;

means for transferring image information over the communication line;

means for transferring digital data over the communication line, whereby the customer representative and the user interact via the transferred audio information and the transferred video information; and means for transferring diagnostic information about the user computer from the user computer to the customer service center over the communication line, whereby the customer service representative can diagnose the fault in the user computer.

2. The online computer support system of claim 1, wherein the image information includes video images.

3. The online computer support system of claim 2, wherein video images sent from the customer service center are played simultaneously with audio information to produce a real-time video including images and synchronized audio at the user computer.

4. The online computer support system of claim 3, wherein the electronic equipment includes means for allowing the customer representative to annotate the video images with additional information.

5. The online computer support system of claim 4, wherein the means for allowing the customer representative to annotate the video images comprises:

a first display screen coupled to a mouse input device;

a pointer displayed on the display screen in response to inputs from the mouse;

means for detecting the mouse inputs and for moving the pointer on the display screen;

wherein the user computer includes a second display screen; and means for transferring information about the pointer movement at the first display screen over the communication line so that there is an indication of the pointer movement at the second display screen.

6. The online computer support system of claim 5, wherein the means for transferring information about the pointer movement includes drawing lines on the second display screen in accordance with the pointer movement.

7. The online computer support system of claim 4, wherein the means for allowing the customer representative to annotate the video images comprises:
a user display screen coupled to the user computer;
means for allowing the customer representative to access and display predefined information on the user display screen during presentation of the real-time video.

8. The online computer support system of claim 1, wherein the user computer includes a display screen, wherein the image information includes an image of the customer representative transferred for display on the display screen.

9. The online computer support system of claim 1, wherein the electronic equipment includes a display screen, wherein the image information includes an image of the user transferred for display on the display screen.

10. The online computer support system of claim 1, further comprising:
storage means coupled to the user computer, wherein the storage means includes one or more predefined specific identifiers indicating one or more aspects of the user computer's configuration; and
transfer means coupled to the storage means and coupled to the communication line for transferring one or more of the specific identifiers from the user computer to the customer service center.

11. The online computer support system of claim 10, wherein the specific identifiers indicate a model number of one or more components in the user computer.

12. The online computer support system of claim 10, wherein the specific identifiers indicate a serial number of one or more components in the user computer.

13. The online computer support system of claim 10, further comprising:
a computer database located at the customer service center;
means for receiving the specific identifiers from the user computer; and
means for using the specific identifiers for performing a database function.

14. The online computer support system of claim 13, wherein the database function is to perform warranty validation of the user computer.

15. The online computer support system of claim 13, wherein the database function is to perform inventory control.

16. The online computer support system of claim 13, wherein the database function is to maintain a service history.

17. The online computer support system of claim 13, wherein the database function is to maintain an upgrade history.

18. The online computer support system of claim 1, further comprising:
means for transmitting a software agent from the customer service center to the user computer; and
means for executing the software agent on the user computer to perform an agent function.

19. The online computer support system of claim 18, wherein the agent function is re-configuring a component of the user computer.

20. The online computer support system of claim 18, wherein the agent function is upgrading a component of the user computer.

21. The online computer support system of claim 18, wherein the agent function is performing preventive maintenance on a component of the user computer.

22. The online computer support system of claim 18, wherein the agent function is fixing a component of the user computer.

23. The online computer support system of claim 18, wherein the agent function is updating access control information in the user computer.

24. The online computer support system of claim 1, wherein one or more of the audio information, image information and digital data are transferred simultaneously over the communication line.

25. The online computer support system of claim 1, wherein one or more of the audio information, image information and digital data are transferred in alternating fashion over the communication line.

26. The online computer support system of claim 1, wherein the user and customer representative communicate in a session, wherein during the session both simultaneous transfer and non-simultaneous transfer of different data types is used.

27. The online computer support system of claim 26, wherein the simultaneous transfer is implemented using Digital Simultaneous Voice/Data (DSVD) protocol, wherein the non-simultaneous transfer is implemented using Asynchronous Voice/Data protocol (AVD).

28. An online computer support system comprising:
a user computer operated by a user and coupled to a communication line;
hardware components coupled to the user computer;
a customer service center including a customer service representative and electronic equipment coupled to the communication line;
means, coupled to the user computer and to the electronic equipment, for transferring digital data over the communication line;
means, coupled to the user computer and the electronic equipment, for transferring audio data and image data over the communication line so that the user and the customer representative can interact; and
means for transferring information about the hardware from the user computer to the customer service center over the communication line for identifying operating characteristics of the hardware to the customer service representative.

29. The online computer support system of claim 28, wherein the means for transferring information about the hardware includes
means for transferring an indication of the manufacturer of a given hardware component.

30. The online computer support system of claim 28, wherein the means for transferring information about the hardware includes
means for transferring an indication of the product name of a given hardware component.

31. The online computer support system of claim 28, wherein a given hardware component has a version number associated with it, wherein the means for transferring information about the hardware includes
means for transferring an indication of the version number of the given hardware component.

32. The online computer support system of claim 28, wherein a given hardware component has a serial number associated with it, wherein the means for transferring information about the hardware includes means for transferring an indication of the serial number of the given hardware component.

33. The online computer support system of claim 28, wherein a given hardware component has an installation time associated with it, wherein the means for transferring information about the hardware includes means for transferring an indication of the installation time of the given hardware component.

34. The online computer support system of claim 28, wherein the user computer includes a processor, wherein the means for transferring information about the hardware includes means for transferring an indication of the processor type.

35. The online computer support system of claim 28, wherein the user computer includes a processor having a speed, wherein the means for transferring information about the hardware includes means for transferring an indication of the processor speed.

36. The online computer support system of claim 28, wherein the user computer includes a processor having a cache, wherein the means for transferring information about the hardware includes means for transferring an indication of the cache size.

37. The online computer support system of claim 28, wherein the user computer includes a numeric co-processor, wherein the means for transferring information about the hardware includes means for transferring an indication of the numeric co-processor type.

38. The online computer support system of claim 10, wherein the user computer includes a basic operating system stored in a non-volatile memory, wherein the means for transferring information about the hardware includes means for transferring an indication of the type of the basic operating system.

39. An online computer support system for diagnosing a problem with a user computer, said system comprising:

a communication line coupled to the user computer;

software residing in the user computer, wherein the software includes a version number associated with the software, wherein the means for transferring information about the software includes means for transferring the version number;

a customer service center including electronic equipment coupled to the communication line;

means, coupled to the user computer and to the electronic equipment, for transferring digital data over the communication line; and means for transferring diagnostic information about the software from the user computer to the customer service center over the communication line.

40. An online computer support system comprising:

a communications link, having a first end and a second end, capable of transferring audio, image, and computer information;

a user computer comprising:

one or more devices, each device having one or more associated designators among index, description, interrupt request line, direct memory access location, input/output range, and memory range;

means for interrogating the user computer for an assessment of the one or more designators;

means for interrogating the user computer for a status of executable processes;

a connection to the first end of the communications link;

means for communicating the assessment and the status as computer information through the communications link;

means for receiving audio, image, and computer information from the communications link; and means for interpreting the computer information received from the communications link;

a user telephone connected to the first end of the communications link;

a communications and data processing server system connected to the second end of the communications link comprising:

means for physically storing and retrieving data;

a data base system for systematically storing, retrieving, and modifying the data, the data base system linked to the means for storing and retrieving data;

means for routing the data among one or more customer service representative stations and the data base system;

means for routing audio, image, and computer information received from the second end of the communications link among the one or more customer service representative stations;

means for routing audio, image, and computer information received from the one or more customer service representative stations to the second end of the communications link; and means for forwarding computer information from the second end of the communications link to the data base system;

and the one or more customer service representative stations comprising:

a computer station linked to the means for routing data;

the computer station linked to the means for routing audio, image, and computer information;

the computer station including means for assembling the data, audio, image, and computer information for presentation to a computer station user;

the computer station including means for collecting data, audio, image, and computer information for routing to the communications and data processing server system; and a station telephone linked to the means for routing audio information.

41. The online computer support system of claim 40 wherein the user computer includes a microphone, one or more speakers, one or more devices for connecting the microphone and the one or more speakers to the user computer; and wherein the user telephone connects to the first end of the communications link through the computer.

42. The online computer support system of claim 40 wherein the computer station includes a microphone, one or more speakers, a video camera, one more devices for connecting the microphone, one or more speakers, and the video camera to the computer station; and wherein the station telephone connects to the means for routing information through the computer station.

43. A method for providing online computer support for diagnosing a fault in a user computer operated by a user and coupled to a communication line comprising:

collecting data about the user computer;

collecting audio information;

steps for transmitting the data and the audio information over the communication line, so that a customer representative and the user interact via the transferred data and audio information; and steps for transferring diagnostic information about the user computer from the user computer to the customer service representative over the communication line, so that the customer service representative can diagnose the fault in the user computer.

44. The method of claim 43, wherein the steps for transmitting the data and audio information and the diagnostic information comprise steps for simultaneous transfer of data and audio information and the diagnostic information.

45. The method of claim 44, wherein the steps for transmitting the data and audio information include steps for transferring video information.

46. The method of claim 43, wherein the steps for transmitting the data and audio information the diagnostic information comprise steps for alternating transfer of data and audio information and the diagnostic information.

47. The method of claim 46, wherein the steps for transmitting the data and audio information include steps for transferring video information.

48. A method for providing online computer support for diagnosing a fault in a user computer operated by a user and coupled to a communication line comprising:

running interrogation software on the user computer to collect data about the user computer;

transferring the data over the communication line to a communications and data processing server;

storing the data on physical data storage associated with the server;

running a system diagnostic program on the user computer;

detecting the fault on the user computer via the system diagnostic program;

notifying the user of the fault;

steps for transferring system information about the user computer and user audio information over the communication line, so that a customer representative and the user interact via the transferred system information and audio information;

linking the system information to the data stored on the physical data storage;

steps for transferring the linked data stored on the physical data storage to the customer service representative;

steps for transferring commands from the customer service representative to the user computer over the communications line; and steps for transferring diagnostic information about the user computer from the user computer to the customer service representative over the communication line, so that the customer service representative can diagnose the fault in the user computer.

49. The method of claim 48, wherein the steps for transmitting system information, audio information, diagnostic information, and commands comprise steps for simultaneous transfer of system information, audio information, diagnostic information, and commands.

50. The method of claim 49, wherein the steps for transmitting the audio information include steps for transferring video information.

51. The method of claim 48, wherein the steps for transmitting system information, audio information, diagnostic information, and commands comprise steps for alternating transfer of system information, audio information, diagnostic information, and commands.

52. The method of claim 51, wherein the steps for transmitting the audio information include steps for transferring video information.

53. A method for providing online computer support for diagnosing a fault in a user computer operated by a user and coupled to a communication line comprising:

running interrogation software on the user computer to collect data about the user computer;

transferring the data over the communication line to a communications and data processing server;

storing the data on physical data storage associated with the server;

steps for transferring user audio information over the communication line, so that a customer representative and the user interact via the audio information;

linking the audio information to the data stored on the physical data storage;

steps for transferring the linked data stored on the physical data storage to the customer service representative;

steps for transferring commands from the customer service representative over the communication line to the user computer, so that the customer service representative directs the running of a system diagnostic program on the user computer; and steps for transferring diagnostic information about the user computer from the user computer to the customer service representative over the communication line, so that the customer service representative can diagnose the fault in the user computer.

* * * * *